United States Patent
Elliot et al.

(10) Patent No.: US 11,993,547 B2
(45) Date of Patent: May 28, 2024

(54) TERMINATION FEEDTHROUGH UNIT WITH CERAMIC INSULATOR FOR VACUUM AND CORROSIVE APPLICATIONS

(71) Applicant: Watlow Electric Manufacturing Company, St. Louis, MO (US)

(72) Inventors: Brent Elliot, Cupertino, CA (US); Dennis George Rex, Williams, OR (US); Guleid Hussen, San Francisco, CA (US); Michael Parker, Arnold, CA (US); Jason Stephens, San Francisco, CA (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 472 days.

(21) Appl. No.: 17/342,212

(22) Filed: Jun. 8, 2021

(65) Prior Publication Data
US 2021/0292246 A1    Sep. 23, 2021

Related U.S. Application Data

(62) Division of application No. 16/169,938, filed on Oct. 24, 2018, now Pat. No. 11,028,021.
(Continued)

(51) Int. Cl.
*C04B 37/02* (2006.01)
*B32B 1/08* (2006.01)
(Continued)

(52) U.S. Cl.
CPC .............. *C04B 37/021* (2013.01); *B32B 1/08* (2013.01); *B32B 15/04* (2013.01); *B32B 15/20* (2013.01);
(Continued)

(58) Field of Classification Search
None
See application file for complete search history.

(56) References Cited

U.S. PATENT DOCUMENTS

| 4,231,003 A | 10/1980 | Ishimaru |
| 5,088,329 A | 2/1992 | Sahagen |

(Continued)

FOREIGN PATENT DOCUMENTS

| CN | 103544998 A | 1/2014 |
| CN | 104854768 A | 8/2015 |

(Continued)

OTHER PUBLICATIONS

Office Action issued in corresponding JP Application No. 2020-522696 dated Oct. 11, 2022 and English translation, 10 pages.

(Continued)

*Primary Examiner* — Seth Dumbris
(74) *Attorney, Agent, or Firm* — Burris Law, PLLC

(57) ABSTRACT

An electrical termination unit or feedthrough which may be used for routing electrical conductors through a chamber wall, or otherwise across a barrier between isolated atmospheric conditions. The electrical termination unit may have aluminum as the interface material to the chamber interface and may utilize a ceramic insulator. The electrical termination unit may have the aluminum used as the interface brazed directly to a ceramic surface of the insulator. The aluminum that forms the chamber interface may be formed within a hollow ceramic tube in the same process step that brazes the aluminum to the ceramic tube with a hermetic joint. Machining subsequent to the brazing of the aluminum to the ceramic insulator may allow for achievement of the final form desired. A method for manufacturing such an electrical termination unit.

20 Claims, 10 Drawing Sheets

Related U.S. Application Data

(60) Provisional application No. 62/576,083, filed on Oct. 24, 2017.

(51) Int. Cl.

| | | |
|---|---|---|
| *B32B 15/04* | (2006.01) | |
| *B32B 15/20* | (2006.01) | |
| *C04B 37/00* | (2006.01) | |
| *H02G 3/22* | (2006.01) | |
| *H05G 2/00* | (2006.01) | |

(52) U.S. Cl.
CPC ............... *C04B 37/00* (2013.01); *H02G 3/22* (2013.01); *H05G 2/00* (2013.01); *B32B 2457/00* (2013.01); *C04B 2237/34* (2013.01); *C04B 2237/343* (2013.01); *C04B 2237/348* (2013.01); *C04B 2237/366* (2013.01); *C04B 2237/402* (2013.01); *C04B 2237/60* (2013.01); *C04B 2237/74* (2013.01); *C04B 2237/84* (2013.01)

(56) References Cited

U.S. PATENT DOCUMENTS

| | | | |
|---|---|---|---|
| 7,341,802 B1 | 3/2008 | Ota et al. | |
| 9,320,133 B2 | 4/2016 | Rathburn | |
| 9,492,659 B2 | 11/2016 | Tang et al. | |
| 2001/0042744 A1 | 11/2001 | Tachikawa et al. | |
| 2003/0063639 A1* | 4/2003 | Yatskar ................ | H01S 3/0941 372/36 |
| 2010/0258330 A1 | 10/2010 | Sy et al. | |
| 2012/0138361 A1 | 6/2012 | Elliot | |
| 2014/0318855 A1 | 10/2014 | Haynes et al. | |
| 2015/0325400 A1 | 11/2015 | Hans | |
| 2016/0099130 A1* | 4/2016 | Ando ................ | H01J 37/32522 315/111.21 |
| 2016/0184912 A1 | 6/2016 | Elliot et al. | |
| 2016/0314886 A1 | 10/2016 | Belton et al. | |

FOREIGN PATENT DOCUMENTS

| | | | | |
|---|---|---|---|---|
| CN | 206236500 U | 6/2017 | | |
| CN | 103730750 B | 9/2017 | | |
| DE | 1490333 | 1/1969 | | |
| EP | 852399 A1 * | 7/1998 | ........... | H01L 23/427 |
| EP | 2853289 A1 | 4/2015 | | |
| JP | S5075418 U | 7/1975 | | |
| JP | S52133986 U | 10/1977 | | |
| JP | 2001326181 A | 11/2001 | | |
| JP | 2005135727 | 5/2005 | | |
| JP | 2006324229 | 11/2006 | | |
| JP | 2012119321 A | 6/2012 | | |
| JP | 2016522881 A | 8/2016 | | |
| TW | M512834 U | 11/2015 | | |
| TW | I527317 B | 3/2016 | | |
| WO | 2013082564 | 6/2013 | | |
| WO | 2015086242 A1 | 6/2015 | | |

OTHER PUBLICATIONS

Search Report appended to an Office Action issued in corresponding TW Application No. 107137588, dated Jul. 12, 2022, 1 page.
European Search Report issued in Corresponding EP Application No. 18870123.9; dated Jul. 9, 2021.
Office Action issued in corresponding CN Application No. 201880069326.6, issued Jan. 27, 2024, and an English Translation, 16 pages.

* cited by examiner

TERMINATION FEEDTHROUGH UNIT WITH CERAMIC INSULATOR FOR VACUUM AND CORROSIVE APPLICATIONS

CROSS-REFERENCE TO RELATED APPLICATIONS

This application is a divisional of U.S. patent application Ser. No. 16/169,938 filed Oct. 24, 2018, which claims priority to U.S. Patent Application No. 62/576,083 filed Oct. 24, 2017, which are hereby incorporated by reference in their entirety.

BACKGROUND

Electrical feedthroughs are commonly used to transfer electrical power and signals between a device within a vacuum chamber and equipment positioned outside the vacuum chamber. For example, some devices in a vacuum chamber, such as thermal evaporation sources or substrate heater, need electrical power from the exterior of the vacuum chambers. In addition, some devices in vacuum chambers, such as temperature sensors or measurement devices, have to send signals to equipment outside of the vacuum chambers for analysis.

An electrical feedthrough for these environments is generally an airtight passage mounted on the wall of a vacuum chamber. One or more conductors may be provided in an electrical feedthrough. Each conductor is surrounded by insulators to keep it insulated from the wall of the chamber. The insulators may be glass or ceramic materials.

Some electric feedthroughs have glass-to-metal seals with pin contacts used with standard connectors. Some other approaches use ceramic-metal brazed pins mounted on metal flanges. Many electric feedthroughs use Kovar in an attempt to match the coefficient of thermal expansion of the metallic of the ceramic insulator. Kovar has distinct disadvantages with regard to welding, including the likelihood that expensive e-beam welding must be used.

In other applications, a metal conduit tube, which may be aluminum, is needed to be hermetically joined to a ceramic structure, such as a plug. The metal tube allows for the joining sheathed item, such as a power or telemetry lead, to have it sheath hermetically joined to the metal tube, while routing the lead through a hermetic sealed passageway through the ceramic.

What is needed is an electric feedthrough which uses material with a good match of thermal expansion to a ceramic insulator and which is able to manufactured inexpensively.

SUMMARY

An electrical termination unit or feedthrough which may be used for routing electrical conductors through a chamber wall, or otherwise across a barrier between isolated atmospheric conditions. The electrical termination unit or feedthrough may have aluminum as an interface material and may utilize a ceramic insulator. The electrical termination unit or feedthrough may have the aluminum brazed directly to a ceramic surface of the insulator. The aluminum may be formed within a hollow ceramic tube in the same process step that brazes the aluminum to the ceramic tube with a hermetic joint. Machining subsequent to the brazing of the aluminum to the ceramic insulator may allow for achievement of the final form desired. A method for manufacturing such an electrical termination or feedthrough unit.

DETAILED DESCRIPTION

Figure 1:
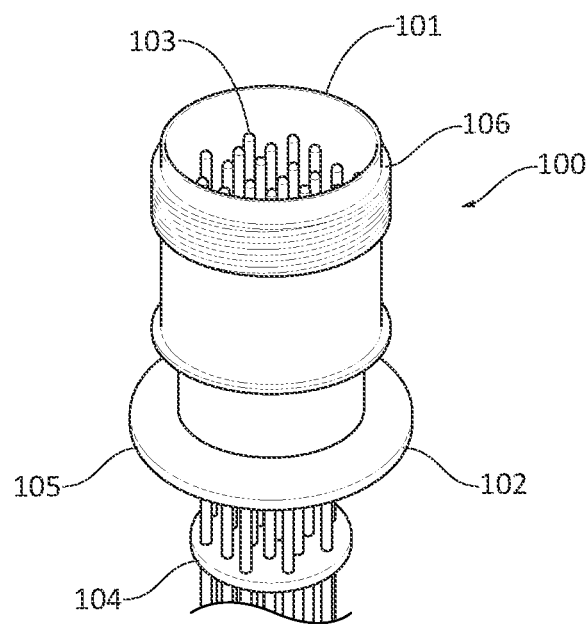
FIG. 1 is a photograph of an electrical feedthrough.

FIG. 1 is an illustrative example of a prior art electrical feedthrough 100. Passing of electrical signals via feedthroughs which pass through vessel walls is a common requirement. Such feedthroughs have as basic requirements the ability to withstand necessary operating pressures, environments, and temperatures, while electrically isolating the needed electrical signals from the vessel wall. Feedthroughs utilized in vacuum systems typically are required to operate with a 1 ATM pressure differential with leak rates $<1 \times 10^{-9}$ sccm of He, and temperatures of several hundred degrees Celsius, while passing signals which can include power, radio frequency, instrumentation, and others. Other types of applications such as chemical processing, oil & gas applications and others may require different operating specifications such as higher pressures, temperatures, and chemical compatibility.

The electrical feedthrough 100 may have a first end 101 adapted to couple to an electrical cable with a cabling connector 106. Connector pins 103 may reside within the first end 101. A second end 102 may include electrical conductors 104 which may be separated by an insulator 104.

Figure 2:
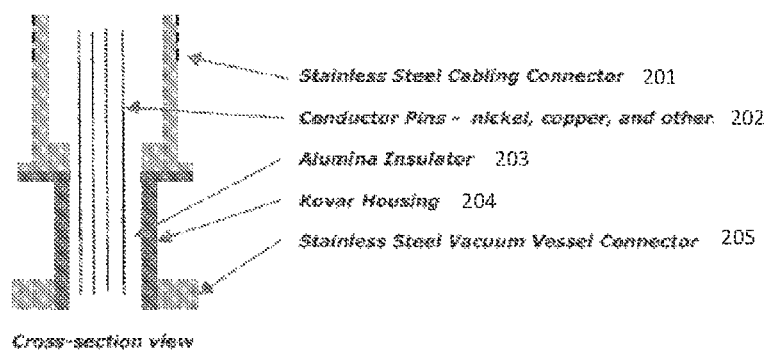
FIG. 2 is a cross-section of an electrical feedthrough.
Figure 3:
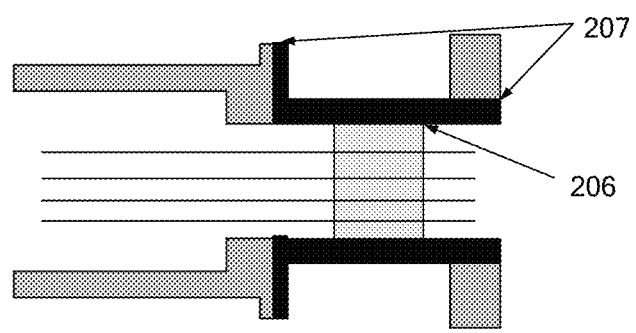
FIG. 3 is a cross-section of an electrical feedthrough.

FIGS. 2 and 3 are figurative cross-sectional views of a prior art electrical feedthrough which includes a Kovar housing. A ceramic part 203, typically aluminum oxide, is used for electrical insulation with a plurality of electrical conductors 202 brazed into the ceramic. The outer edge of the ceramic insulator 202 is brazed into a Kovar tubulation 204—Kovar is used to match the thermal expansion of the ceramic—and the Kovar is then welded to another metal 201, 205—typically a stainless steel alloy such as 303, 304, or 316—which is used as the connection to the vessel and to the connector to the cabling carrying the electrical signals.

There are several drawbacks with design and manufacturing of the electrical feedthroughs shown in FIGS. 2 and 3. These drawbacks relate to the use of Kovar as the housing for the alumina ceramic insulator. Kovar is used to match the CTE of the ceramic. During manufacturing, the alumina insulator is brazed to the Kovar. Brazing is typically done using a moly-manganese layer 206 on the alumina with a copper-silver brazing alloy, which is done at temperatures over 800 C. If a housing other than Kovar is used, the resulting stresses for the mismatch of the low CTE alumina and the high CTE metal will result in cracking of the ceramic. Kovar also has some undesirable characteristics. It lacks mechanical properties to make it a good connector for either the cabling or the vessel. It cannot be easily welded— welding it to stainless steel, which has the properties needed for good connectors, requires the use of e-beam welding in a few locations 207, which is expensive and slow. And Kovar itself is expensive, with limited supply.

In contrast to the above-mentioned designs, electrical feedthroughs and electrical termination units according to the present invention allow for the brazing of metal directly to the ceramic, without the use of Kovar and without the use of other materials as a wetting agent, such as moly-manganese. In some aspects, a ceramic insulator is fashioned with a hollow portion which allows for the insertion of aluminum into the hollow portion. The aluminum may be inserted as a powder, a foil, or other form. The aluminum is then brazed to the interior surface of the hollow portion of the ceramic insulator with a hermetic brazed joint. In some aspects, the ceramic may be of a non-diffusable type, such as aluminum nitride, alumina, beryllium oxide, or zirconia.

In some aspects, an electrical termination for a heater element requires a metal tube hermetically embedded in a ceramic plug. The heater element lead may be sheathed to protect the lead against corrosive process chemistries which may be present in a process chamber, or for other reasons. An aluminum tube hermetically embedded in a ceramic plug allows for the sheath of the heater element lead to be hermetically joined to the aluminum tube, thus continuing the protection of the sheathed element into the ceramic plug. The ceramic also provides electrical isolation of the sheath from the conductor within.

In some embodiments, the joining process is performed in a process chamber adapted to provide very low pressures. Joining processes according to embodiments of the present invention may require an absence of oxygen in order to achieve a hermetically sealed joint. In some embodiments, the process is performed at a pressure lower than 1×10E−4 Torr. In some embodiments, the process is performed at a pressure lower than 1×10E−5 Torr. In some embodiments, further oxygen removal is achieved with the placement of zirconium or titanium in the process chamber. For example, a zirconium inner chamber may be placed around the pieces which are to be joined.

In some embodiments, atmospheres other than vacuum may be used to achieve a hermetic seal. In some embodiments, argon (Ar) atmosphere may be used to achieve hermetic joints. In some embodiments, other noble gasses are used to achieve hermetic joints. In some embodiments, hydrogen (H2) atmosphere may be used to achieve hermetic joints.

The wetting and flow of the brazing layer, and the creation of a hermetic joint or seal, may be sensitive to a variety of factors. The factors of concern include the braze material composition, the ceramic composition, the susceptibility of the ceramic to diffusion by aluminum, the chemical makeup of the atmosphere in the process chamber, especially the level of oxygen in the chamber during the joining process, the temperature, the time at temperature, the thickness of the braze material, the surface characteristics of the material to be joined, the geometry of the pieces to be joined, the physical pressure applied across the joint during the joining process, and/or the joint gap maintained during the joining process. A hermetic joint in accord with embodiments of the present invention is a joint with a leak rate <$1\times10^{-9}$ sccm of He.

An example of a brazing method for joining aluminum to the interior surface of a hollow ceramic insulator may include the steps of filling the insulator with a brazing material selected from the group consisting of aluminum and an aluminum alloy disposed between the first and second ceramic objects, heating the brazing layer to a temperature of at least 800 C, and cooling the brazing layer to a temperature below its melting point so that the brazing layer hardens and creates a hermetic seal so as to join the first member to the second member. Another example of a brazing method for joining aluminum to the interior surface of a hollow ceramic insulator, wherein the ceramics are of a group consisting of aluminum nitride, alumina, beryllium oxide, and zirconia, may include the steps of filling the insulator with a brazing material selected from the group consisting of aluminum and an aluminum alloy disposed between the first and second ceramic objects, heating the brazing layer to a temperature of at least 770 C, and cooling the brazing layer to a temperature below its melting point so that the brazing layer hardens and creates a hermetic seal so as to join the first member to the second member. In some aspects, the brazing temperature may be in the range of 770 C to 1200 C. Various geometries of braze joints may be implemented according to methods described herein.

The hermetic joint of the aluminum to the ceramic according to embodiments of the present invention allows for direct joining of the aluminum to the ceramic surface of the ceramic piece without any intermediate layers. For example, no pre-metallization of the ceramic piece is needed to hermetically join the aluminum to the ceramic. No additional, reactive, elements are needed to achieve the hermetic joining of the aluminum to the ceramic.

Figure 4:
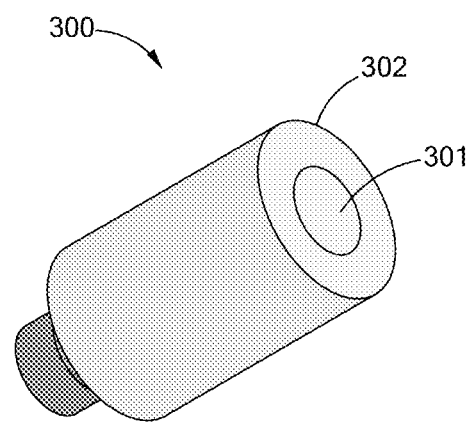
FIG. 4 is a perspective view of a brazing assembly according to some embodiments of the present invention.

A joining process according to some embodiments of the present invention may comprise some or all of the following steps. A ceramic is piece selected for brazing. The ceramic piece has a cavity, which may be a cylindrical hole into the ceramic. In some aspects, the cylindrical hole is in the axial center of the ceramic. The ceramic pieces may be of alumina. The ceramic piece may be of mono-crystalline or poly-crystalline aluminum nitride. The ceramic piece may be selected from a group consisting of aluminum nitride, poly-crystalline alumina, mono-crystalline alumina or sapphire, beryllium oxide, and zirconia, which is a group which demonstrates non-diffusability by aluminum. Other ceramics may be in this group. In an illustrative example, as seen in FIG. 4, the interior surface 303 of the hollow center of a ceramic tube 302 will be filled with a brazing material 301. The joining material may be a brazing material comprising aluminum. In some embodiments, the brazing material may be a commercially available aluminum foil of >99% aluminum content. In some embodiments, the brazing material may be aluminum of greater than 98% by weight. In some embodiments, the aluminum may be greater than 99.99% aluminum by weight. The brazing material may consist of a plurality of layers of foil in some embodiments.

The oven may be evacuated to a pressure of less than 5×10E−5 Torr. In some aspects, vacuum removes the residual oxygen. In some embodiments, a vacuum of lower than 1×10E−5 Torr is used. In some embodiments, the pre-assembly is placed within a zirconium inner chamber which acts as an oxygen attractant, further reducing the residual oxygen which might have found its way towards the joint during processing. In some embodiments, the process oven is purged and re-filled with pure, dehydrated pure noble gas, such as argon gas, to remove the oxygen. In some embodiments, the process oven is purged and re-filled with purified hydrogen to remove the oxygen.

The pre-assembly is then subjected to increases in temperature, and a hold at the joining temperature. Upon initiating the heating cycle, the temperature may be raised slowly, for example 15 C per minute to 200 C and then 20-30 C per minute thereafter, to standardized temperatures, for example, 600 C and the joining temperature, and held at each temperature for a fixed dwell time to allow the vacuum to recover after heating, in order to minimize gradients and/or for other reasons. When the braze temperature has been reached, the temperature can be held for a time to effect the braze reaction. In an exemplary embodiment, the dwell temperature may be 850 C and the dwell time may be 30 minutes. In another exemplary embodiment, the dwell temperature may be 800 C and the dwell time may be 2 hours. In another exemplary embodiment, the dwell temperature may be 1000 C and the dwell time may be 15 minutes. In another exemplary embodiment, the dwell temperature may be 1150 and the dwell time may be 30-45 minutes. In some embodiments, the dwell temperature does not exceed a maximum of 1200 C. In some embodiments, the dwell temperature does not exceed a maximum of 1300 C. The dwell temperature may be in the range of 770 C and 1200 C in some embodiments. The dwell temperature may be in the range of 800 C and 1200 C in some embodiments. Upon achieving sufficient braze dwell time, the furnace may be cooled at a rate of 20 C per minute, or lower when the inherent furnace cooling rate is less, to room temperature. The furnace may be brought to atmospheric pressure, opened and the brazed assembly may be removed for inspection, characterization and/or evaluation.

In some aspects, the cooling of the device is evened with the use of a heat conductive sleeve around the assembly. In an illustrative example, the outside diameter of the ceramic piece may be 1.00 inches. The ceramic piece may be oriented such that the hollow cavity is facing upwards. The ceramic piece may be of alumina. An aluminum nitride sleeve may be place around the ceramic piece during brazing to contribute to maintaining a more even temperature of the ceramic piece, with aluminum within its cavity, during brazing and cooling. In an illustrative example, the AlN sleeve may have an inside diameter of 1.38 inches and may be slightly taller than the alumina ceramic piece.

Assemblies joined as described above result in pieces with hermetic sealing between the aluminum in the ceramic hole feature and the interior surface of the ceramic hole. Such assemblies are then able to be used where atmosphere isolation is an important aspect in the use of the assemblies, as well as electrical isolation. Further, the portion of the joint which may be exposed to various atmospheres when the joined assemblies are later used in semi-conductor processing, for example, will not degrade in such atmospheres, nor will it contaminate the later semi-conductor processing.

Figure 5:
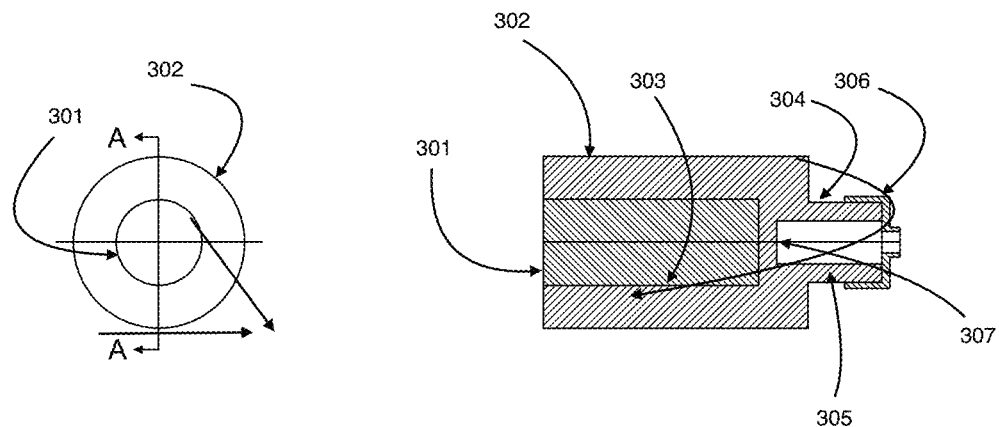
FIG. 5 are orthogonal views of a brazing assembly according to some embodiments of the present invention.
Figure 6:
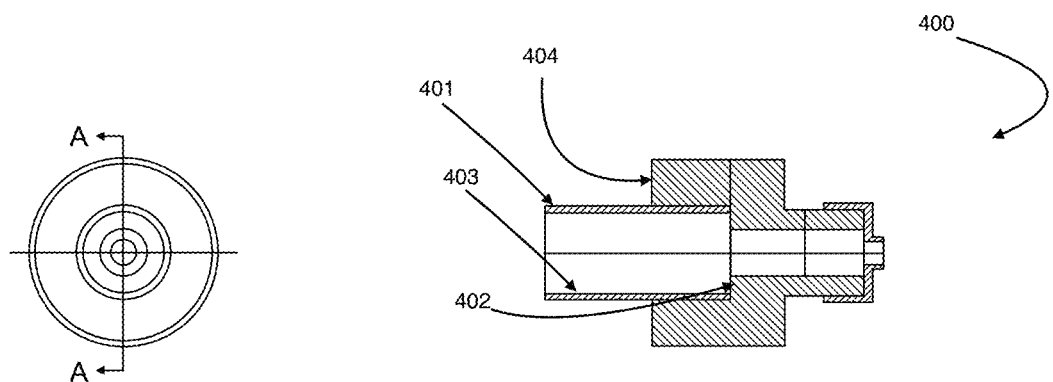
FIG. 6 is a perspective view of a post-brazing assembly according to some embodiments of the present invention.

In some embodiments of the present invention, as seen in FIGS. 4 and 5, a brazing assembly 300 which represents an interim step in the manufacture of a completed electrical termination for a heater element. Although this exemplary embodiment feeds through one aluminum tube, other embodiments may feed through more tubes.

In some embodiments, the ceramic tube 302 may have a blocking portion 307 which separates the hollow center 301 which will be filled with aluminum from a second hollow portion 305. A narrower outer surface 304 may also be seen at this end of the brazing assembly 300.

In some embodiments, a cap 306 is seen around the narrower outer surface of the brazing assembly. The cap 306 may be a nickel cap. In some embodiments, the nickel cap is brazed to the alumina ceramic narrower outer surface of the brazing assembly. In some embodiments, the nickel cap may be brazed onto the alumina during the same process step during which the aluminum is joined to the inner surface of the main hollow of the ceramic piece. The nickel cap may be copper brazed at approximately 1100 C, which is a temperature at which the aluminum may also be brazed. In some embodiments, the nickel cap is first brazed, and the aluminum is brazed in a second brazing step at a lower temperature. In an illustrative example, the nickel cap may be brazed to the ceramic which is pre-metallized with a moly-manganese layer, using a copper braze. This first braze step may take place at 1083 C. The unit may then have the aluminum placed into the hollow of the ceramic piece, and brazed at a temperature of 850 C.

After the brazing process or processes, the brazing assembly 300 may be moved along to become the post-brazing assembly 400. A portion 404 of the ceramic tube may be removed to expose the outer surface 401 of the aluminum which had been brazed into the ceramic tube. The center portion of the aluminum 301 may be removed to form an aluminum tube 403. The blocking portion 307 may be removed to allow a continuous passage 402 from within the aluminum tube 403 to the nickel cap 306.

Figure 7:
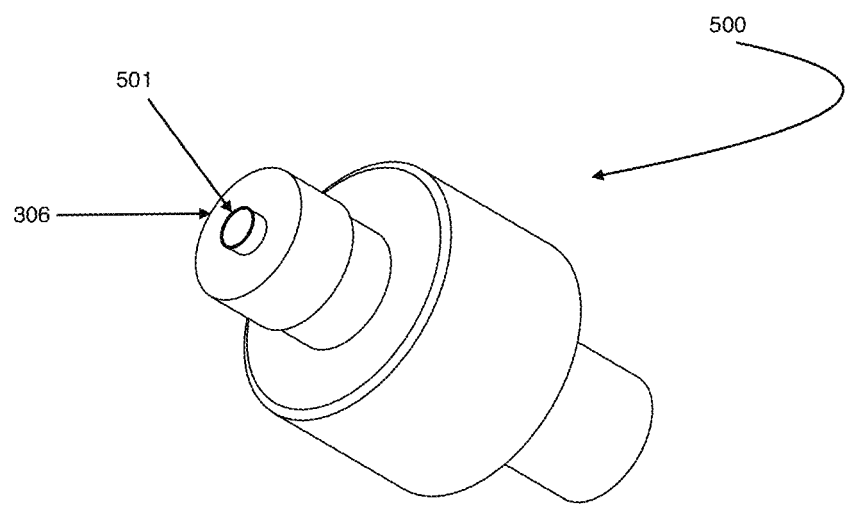
FIG. 7 are orthogonal views of a post-brazing assembly according to some embodiments of the present invention.
Figure 8:
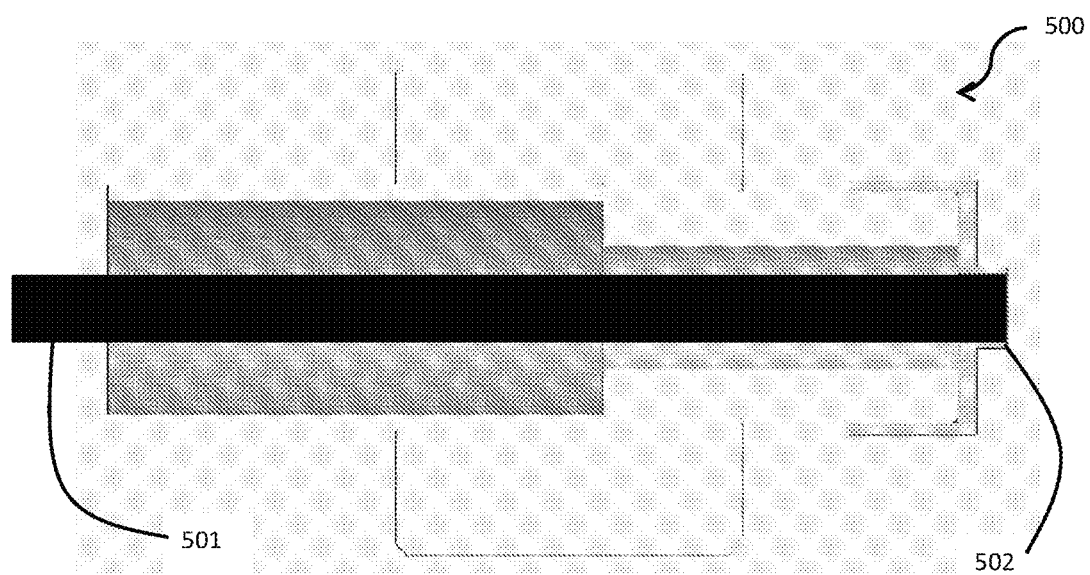
FIG. 8 is a cross-sectional view of an electrical termination feedthrough according to some embodiments of the present invention.

FIG. 7, and FIG. 8 in cross-section, illustrate an exemplary single conductor electrical termination 500 after the insertion of a conductor 501 which may be welded 502 to the nickel cap 306. The conductor 501 may be hermetically sheathed to protect the conductor, for example with an external sheath. The sheath may then be hermetically joined to the inner or outer surface 401 of the aluminum tube. With the hermetic joining of the aluminum tube to the inner or outer surface 303 of the ceramic piece, the hermetic protection of the conductor 501 which is present in the sheathed conductor assembly is carried through into the ceramic piece, and with hermetic joining of the conductor at the nickel cap 306, the conductor has been hermetically sealed. In some aspects, the external ceramic surface of the electrical termination 500 may be otherwise sealed such that the aluminum tube side of the electrical termination unit is isolated from the nickel cap side of the electrical termination unit.

Figure 9:
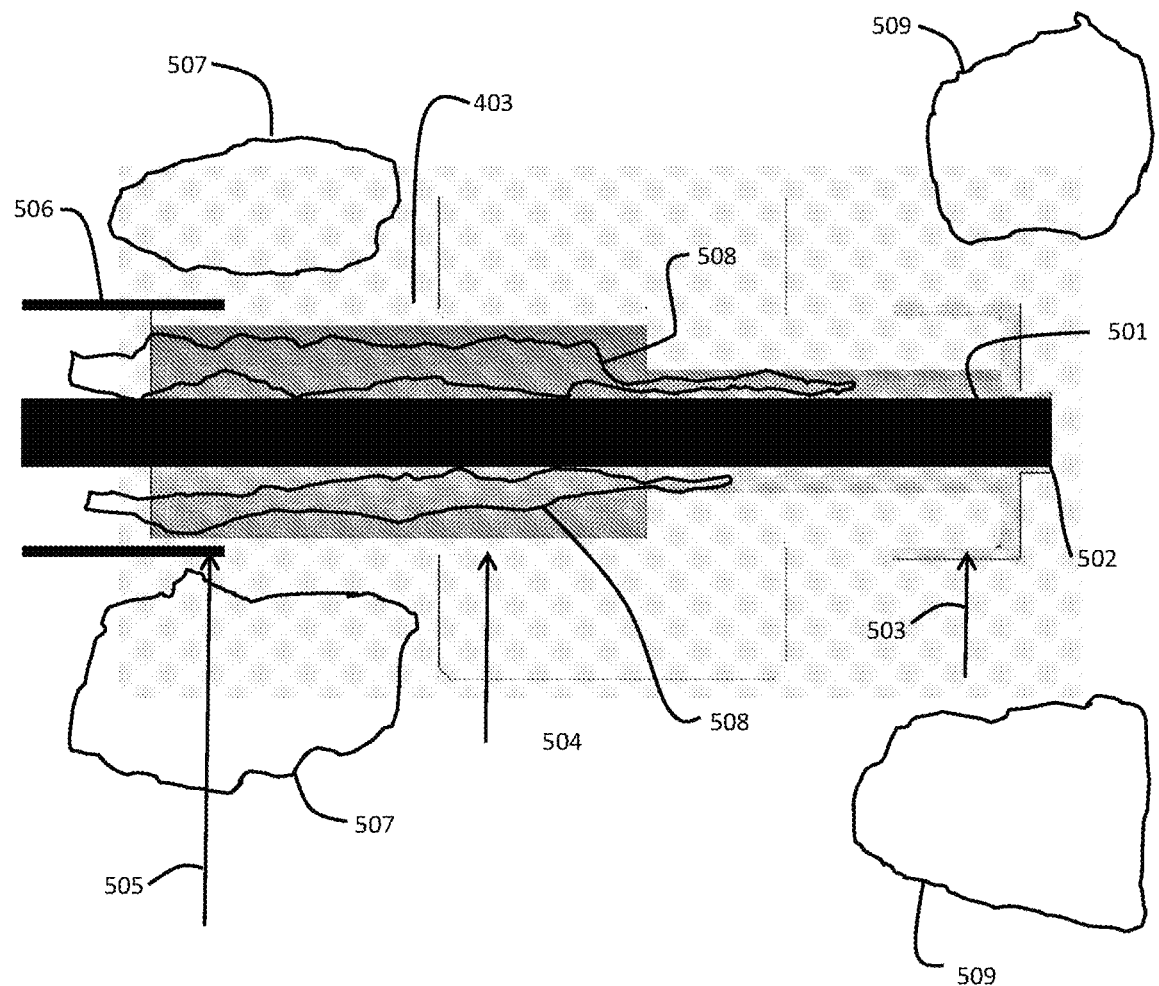
FIG. 9 is a cross-sectional view of an electrical termination feedthrough according to some embodiments of the present invention.

FIG. 9 illustrates the electrical termination 500 with a sheath 506 joined to the aluminum tube with a hermetic joint 505. The sheath 506 may be aluminum and the joint may be a weld. The aluminum is brazed to the ceramic with a hermetic joint 504. At the end of the electrical termination, the nickel cap 306 is joined to the ceramic with a hermetic joint 503. The weld 502 of the nickel cap 306 to the conductor 501 is also hermetic. The series of hermetic joints isolates the atmosphere 508 within the sheath and within the ceramic plug from the atmospheres 507 and 509. Further, the ceramic electrically isolates the aluminum tube from the conductor 501 and the nickel cap 306.

Figure 10A:
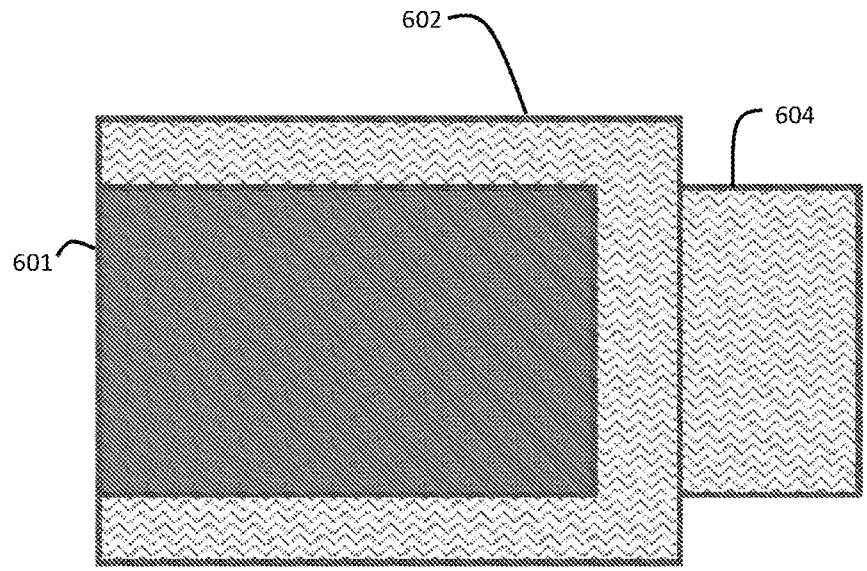
FIGS. 10A-E are views illustrating the manufacture of a feedthrough according to some embodiments of the present invention.

FIGS. 10A-E illustrate manufacturing steps for the manufacture of an electrical feedthrough 600. FIG. 10A illustrates an interim step with a ceramic piece 602, which may be cylindrical in shape. The ceramic piece 602 may be of a larger diameter in a first section, and may have a neckdown to a smaller diameter section 604. The ceramic piece 602 may has a hole, which may be a cylindrical hole wherein an aluminum portion 601 has been brazed with, according to process steps as described above. In some embodiments, the ceramic is alumina. In some embodiments, the ceramic is aluminum nitride. In some embodiments, the ceramic is a non-diffusing ceramic as described above. In some embodiments, the aluminum is greater than 98% aluminum by weight. In some embodiments, the aluminum is greater than 99% aluminum by weight. In some embodiments, the aluminum is greater than 99.9% aluminum by weight. At this stage, as seen in FIG. 10A, the aluminum portion 601 has been brazed to the interior of the hole in the ceramic piece 602, and is now joined to the ceramic with a hermetic joint.

Figure 10B:
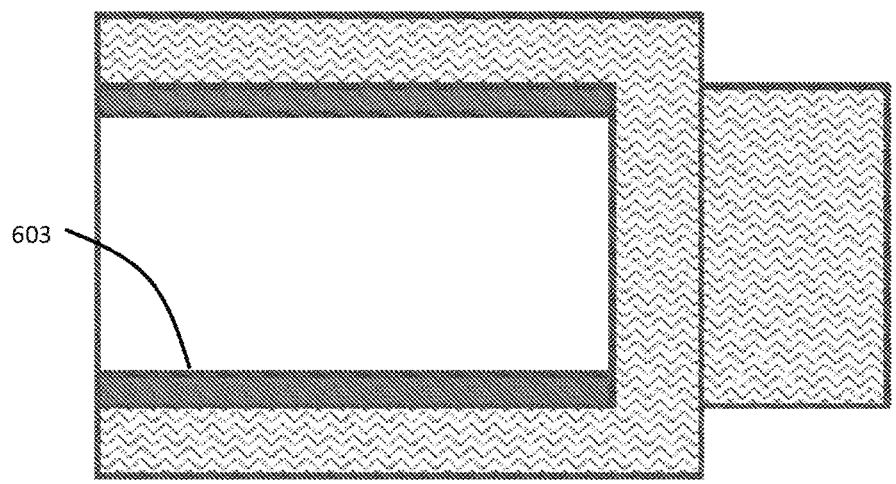

FIG. 10B illustrates a further step in the manufacture of a feedthrough 600 according to some embodiments of the present invention. At this stage, the center of the aluminum portion 601 has been removed to create an aluminum tube 603, as seen in cross-section in FIG. 10B. The aluminum removed may be removed by mechanical machining techniques, or other appropriate methods. The outer surface of the aluminum tube 603 is hermetically joined to the inner surface of the ceramic piece 602.

Figure 10C:
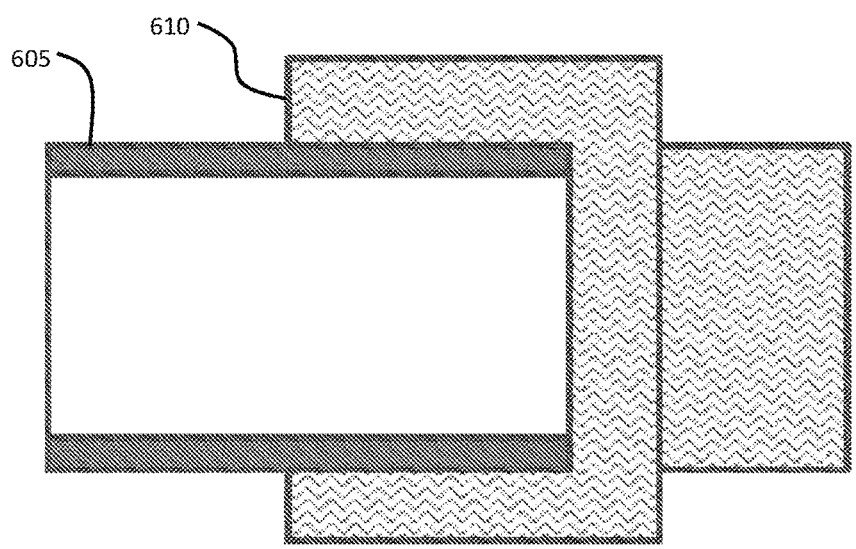

FIG. 10C illustrates a further step in the manufacture of a feedthrough 600 according to some embodiments of the present invention. At this stage, a segment of the ceramic piece 602 has been removed back to a point 610 which exposes an outer surface 605 of the aluminum tube 603. At this stage, there is now an aluminum tube extending from a ceramic piece wherein an outer surface of the aluminum tube is joined to the inner surface of a ceramic piece with a hermetic joint.

Figure 10D:
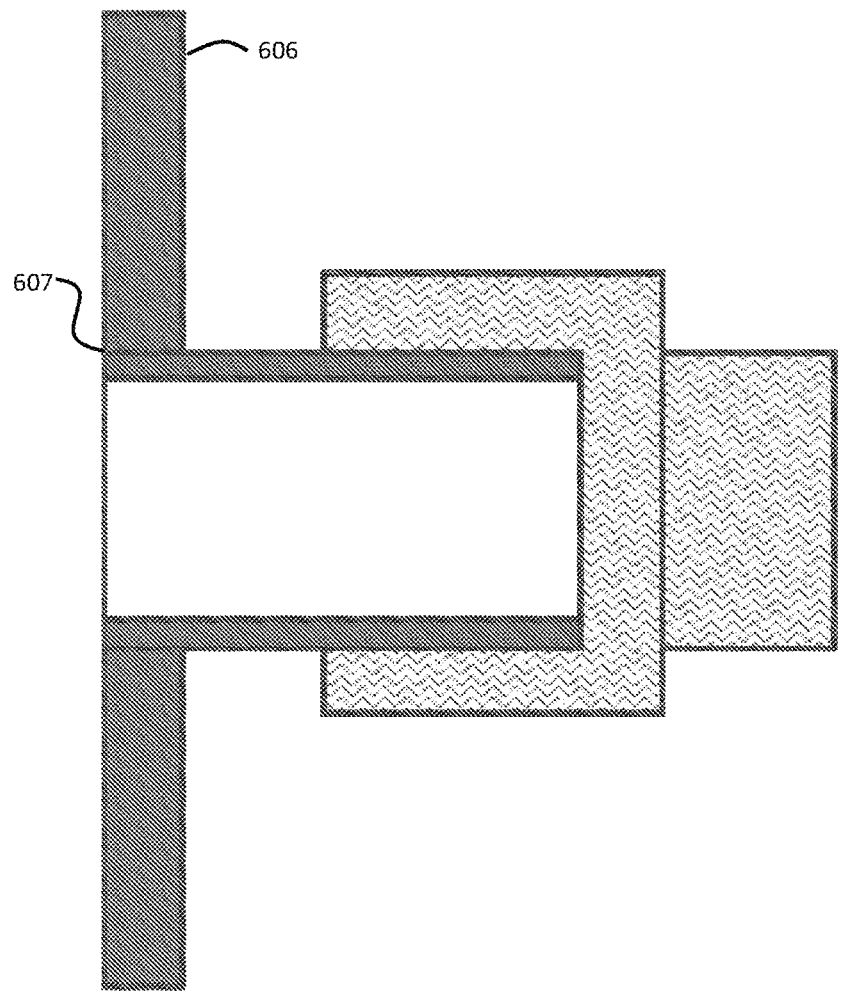
Figure 10E:
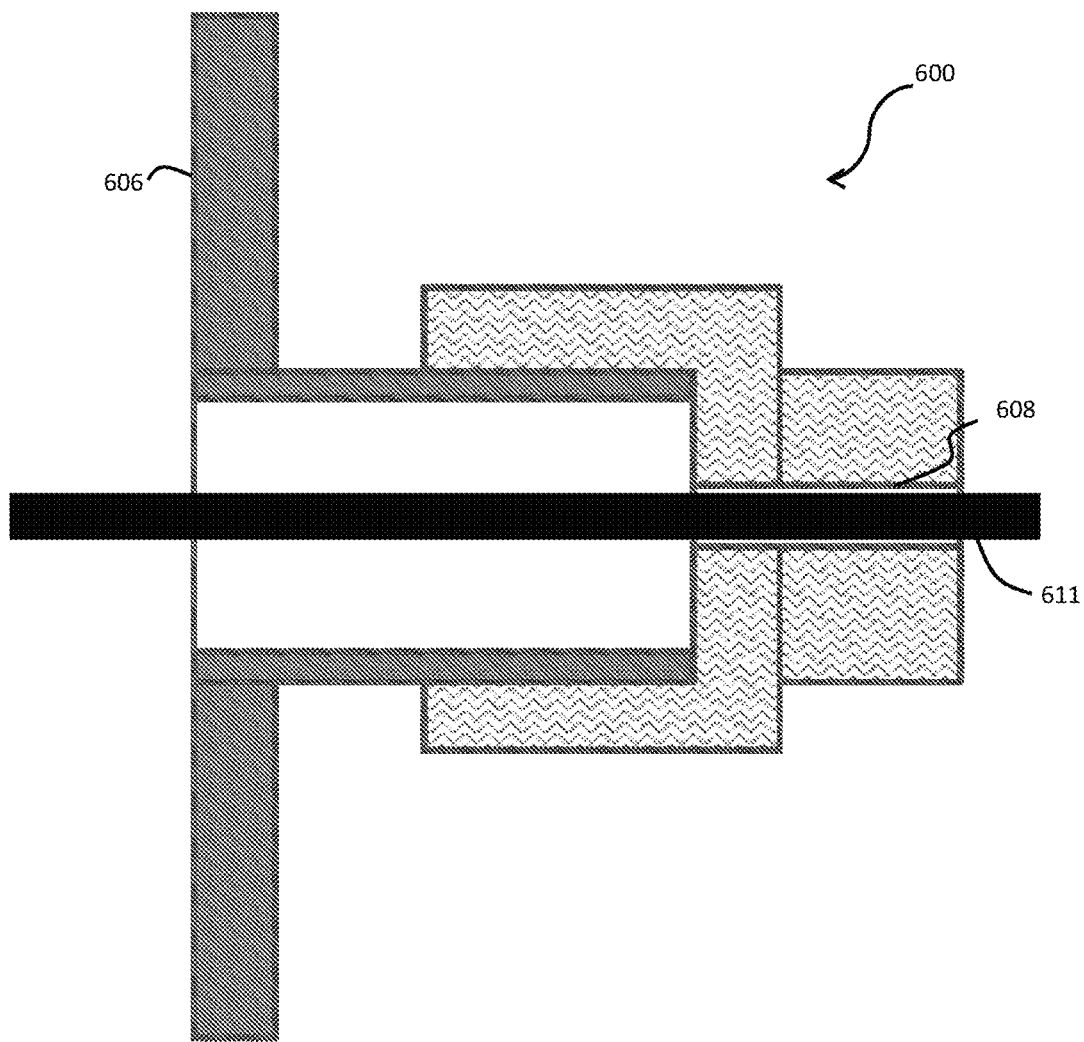

FIG. 10D illustrates a further step in the manufacture of a feedthrough 600 according to some embodiments of the present invention. At this stage, a flange 602 has been joined to the aluminum tube 603. The flange 602 may be joined to the aluminum tube with a weld 607 around the outer periphery of the aluminum tube 603 in some embodiments. The flange 602 may be adapted to mount to an interfacing feedthrough attach point on a process chamber, for example. This construction now has a feedthrough flange hermetically coupled to an aluminum tube, which is hermetically joined to a ceramic piece. The ceramic piece electrically isolates items which may be routed through the ceramic plug from the mounting flange, and from the chamber wall.

FIG. 10D illustrates a further step in the manufacture of a feedthrough 600 according to some embodiments of the present invention. At this stage, a passageway 608 has been created through the ceramic piece 602, which may allow for the passage of conductors or other items through the ceramic piece 602. In some aspects, there may be more than one passageway 608. In some aspects, the passageway or passageways may be created at an earlier stage in the manufacturing process. In some aspects, items such as conductors which utilize the passageways may be affixed to the ceramic plug during an earlier stage of manufacture. A conductor 611 may be inserted into the passageway 608 and joined to the ceramic piece 602 using an appropriate joining method. In some aspects, a plurality of conductors 611 may traverse through a plurality of passageways 608, as in the case of a multi-pin feedthrough.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A ceramic structure, said ceramic structure comprising:
a ceramic piece having a first end and a second end, said ceramic piece comprising a hole at the first end, said hole having an inner ceramic surface; and
an aluminum tube, said aluminum tube having an inner surface and an outer surface, wherein the outer surface of said aluminum tube is brazed and hermetically joined to the inner ceramic surface of the hole, and wherein a first portion of the outer surface of the aluminum tube is in direct contact with the inner ceramic surface of the ceramic piece at a hermetic joint within the center of an annular of the ceramic piece at the first end and a second portion of the outer surface of the aluminum tube is exposed at the first end of the ceramic piece.

2. The ceramic structure of claim 1, wherein said aluminum tube comprises greater than 99% by weight aluminum.

3. The ceramic structure of claim 1, wherein said ceramic piece comprises a ceramic from the group consisting of alumina, aluminum nitride, beryllium oxide, and zirconia.

4. The ceramic structure of claim 1, wherein the hole has a spherical shape.

5. The ceramic structure of claim 1, wherein the ceramic piece has a larger diameter in a first section, and has a smaller diameter in a second section.

6. The ceramic structure of claim 2, wherein said ceramic piece comprises a ceramic from the group consisting of alumina, aluminum nitride, beryllium oxide, and zirconia.

7. The ceramic structure of claim 2, wherein the hole has a spherical shape.

8. The ceramic structure of claim 2, wherein the ceramic piece has a larger diameter in a first section, and has a smaller diameter in a second section.

9. A ceramic structure, said ceramic structure comprising:
a ceramic piece having a first end and a second end, said ceramic piece comprising a hole at the first end, said hole having an inner ceramic surface; and
an aluminum tube, said aluminum tube comprising greater than 99% by weight aluminum and having an inner surface and an outer surface, wherein the outer surface of said aluminum tube is hermetically joined to the inner ceramic surface of the hole, and wherein a first portion of the outer surface of the aluminum tube is in direct contact with the inner ceramic surface of the ceramic piece at a hermetic joint within the center of an annular of the ceramic piece at the first end and a second portion of the outer surface of the aluminum tube is exposed at the first end of the ceramic piece.

10. The ceramic structure of claim 9, wherein said ceramic piece comprises a ceramic from the group consisting of alumina, aluminum nitride, beryllium oxide, and zirconia.

11. The ceramic structure of claim 10, wherein the ceramic piece has a larger diameter in a first section, and has a smaller diameter in a second section.

12. The ceramic structure of claim 9, wherein the hole has a spherical shape.

13. The ceramic structure of claim 9, wherein the ceramic piece has a larger diameter in a first section, and has a smaller diameter in a second section.

14. The ceramic structure of claim 13, wherein said ceramic piece comprises a ceramic from the group consisting of alumina, aluminum nitride, beryllium oxide, and zirconia.

15. A ceramic structure, said ceramic structure comprising:
a ceramic piece having a first end and a second end, said ceramic piece comprising a hole at the first end, said hole having an inner ceramic surface; and
an aluminum tube, said aluminum tube having an inner surface and an outer surface, wherein the outer surface of said aluminum tube is brazed and hermetically joined to the inner ceramic surface of the hole by a brazing material, said brazing material is chosen from a group consisting of aluminum foil comprising greater than 99% by weight aluminum, aluminum comprising greater than 98% by weight aluminum, aluminum comprising greater than 99.99% by weight aluminum, and a plurality of layers of foil, and wherein a first portion of the outer surface of the aluminum tube is in direct contact with the inner ceramic surface of the ceramic piece at a hermetic joint within the center of an annular of the ceramic piece at the first end and a second portion of the outer surface of the aluminum tube is exposed at the first end of the ceramic piece.

16. The ceramic structure of claim 15, wherein said ceramic piece comprises a ceramic from the group consisting of alumina, aluminum nitride, beryllium oxide, and zirconia.

17. The ceramic structure of claim 15, wherein the hole has a spherical shape.

18. The ceramic structure of claim 15, wherein the ceramic piece has a larger diameter in a first section, and has a smaller diameter in a second section.

19. The ceramic structure of claim 18, wherein said ceramic piece comprises a ceramic from the group consisting of alumina, aluminum nitride, beryllium oxide, and zirconia.

20. The ceramic structure of claim 18, wherein the hole has a spherical shape.

* * * * *